No. 678,372. Patented July 16, 1901.
A. F. BLAGDON-RICHARDS.
SPRING FOR VELOCIPEDE SADDLES.
(Application filed Nov. 9, 1898.)
(No Model.) 3 Sheets—Sheet 1.

No. 678,372. Patented July 16, 1901.
A. F. BLAGDON-RICHARDS.
SPRING FOR VELOCIPEDE SADDLES.
(Application filed Nov. 9, 1898.)

(No Model.) 3 Sheets—Sheet 2.

No. 678,372. Patented July 16, 1901.
A. F. BLAGDON-RICHARDS.
SPRING FOR VELOCIPEDE SADDLES.
(Application filed Nov. 9, 1898.)

(No Model.) 3 Sheets—Sheet 3.

Witnesses:

Inventor:
Albert F. Blagdon-Richards

UNITED STATES PATENT OFFICE.

ALBERT FRANCIS BLAGDON-RICHARDS, OF SWANSEA, ENGLAND.

SPRING FOR VELOCIPEDE-SADDLES.

SPECIFICATION forming part of Letters Patent No. 678,372, dated July 16, 1901.

Application filed November 9, 1898. Serial No. 695,947. (No model.)

*To all whom it may concern:*

Be it known that I, ALBERT FRANCIS BLAGDON-RICHARDS, a subject of the Queen of England, residing at Swansea, Wales, have invented a certain new and useful Spring for Use in Connection with Saddles for Bicycles and Tricycles, (for which I have applied for Letters Patent in Great Britain, No. 9,055, dated April 19, 1898,) of which the following is a specification.

This invention relates to a spring for use in connection with saddles for bicycles, tricycles, or other vehicles, and has for its object to reduce the jolting caused when a machine is traveling over rough or uneven ground. The spring is fixed to the saddle-support or that part of the machine to which the saddle, which may have its own special springs, is usually attached. It can, however, be fixed to any horizontal bar parallel to the length of the saddle.

Figure 1:
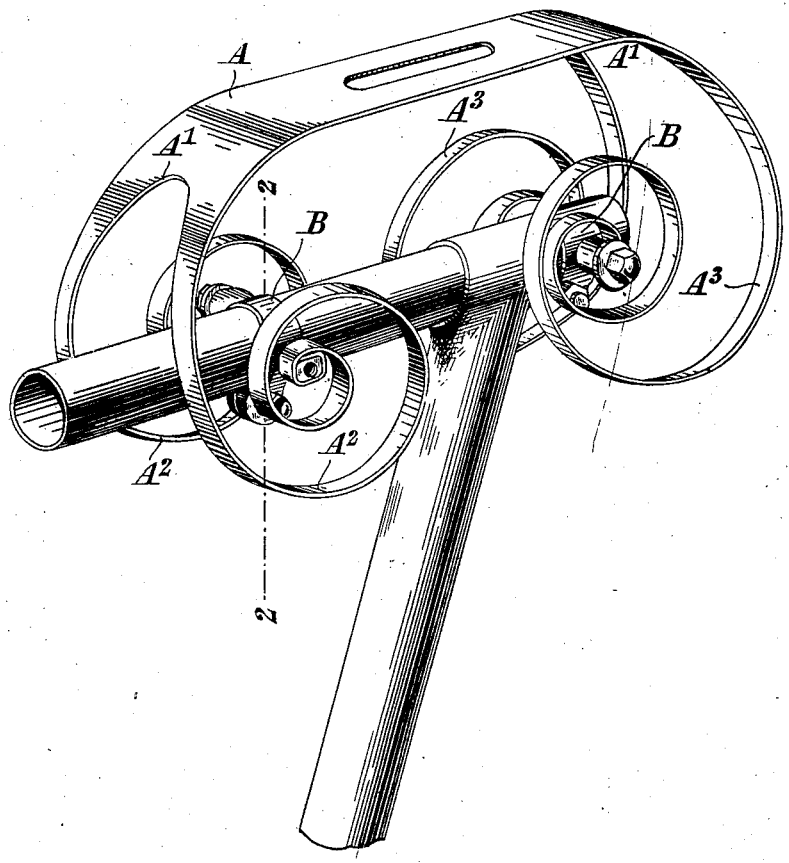
Figure 2:
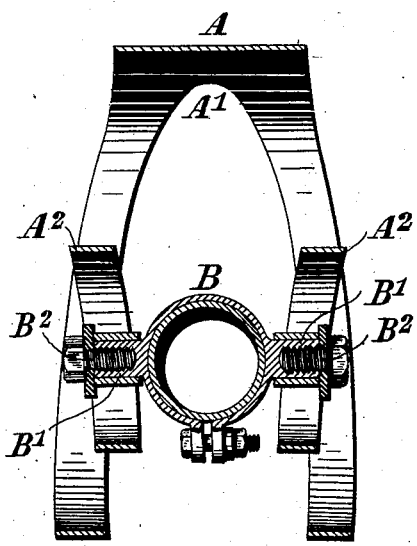
Figure 4:
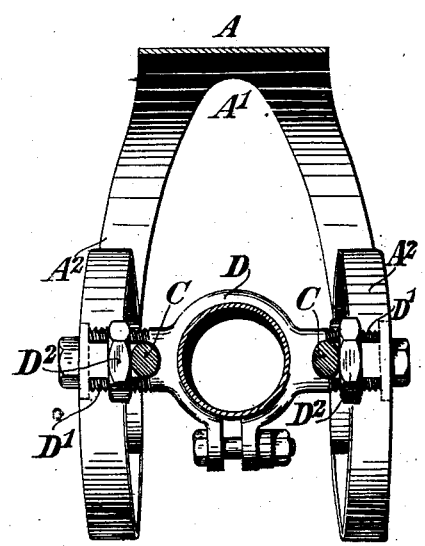
Figure 3:
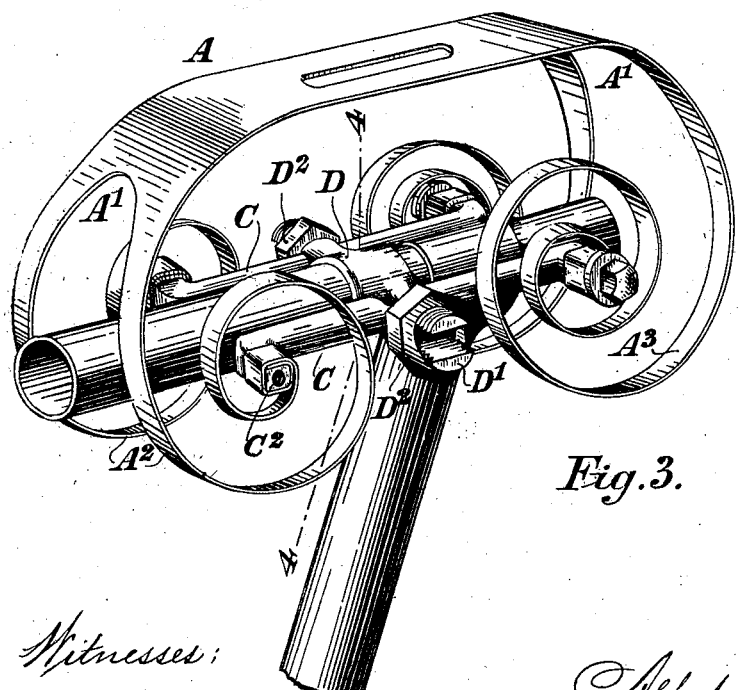
Figure 5:
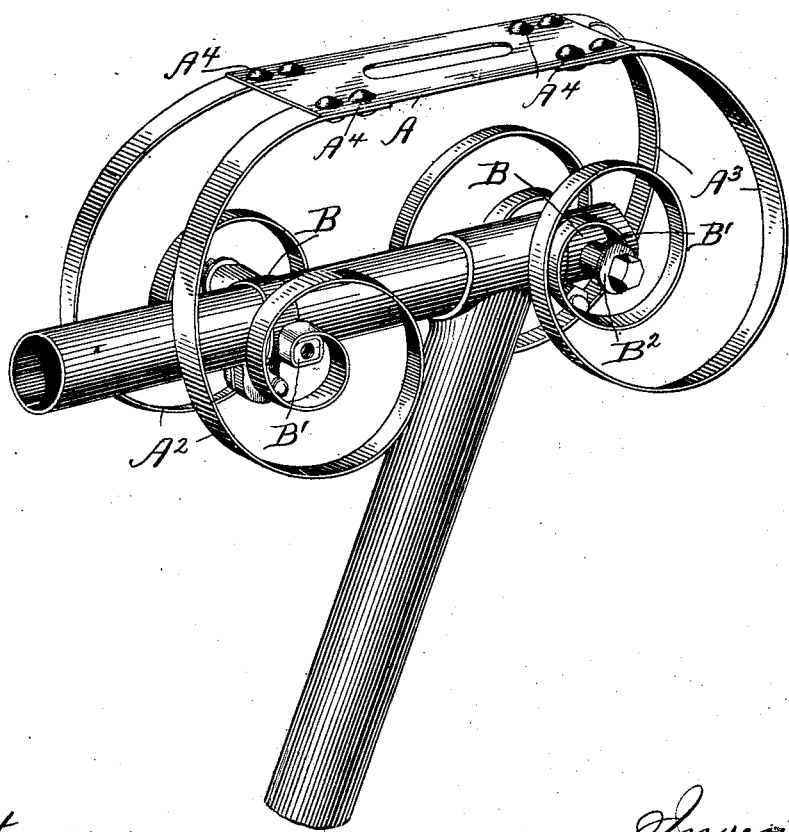

In the accompanying drawings, Figure 1 is a perspective view of a spring constructed in accordance with this invention in place upon an L-pin or saddle-support. Fig. 2 is a section on the line 2 2 of Fig. 1. Fig. 3 is a view similar to Fig. 1, except that it illustrates an alternative mode of attaching the spring to the L-pin or saddle-support of the cycle. Fig. 4 is a section on the line 4 4 of Fig. 3. Fig. 5 is a perspective view illustrating a modification in the construction of the spring.

Like letters indicate like parts throughout the drawings.

The spring comprises a steel band A, forked at each end, as at A'. The pair of prongs thus formed are coiled into volute springs $A^2$ $A^3$, which extend down at each side of the L-pin or other saddle-support of the bicycle or tricycle. The ends of the springs are attached to the L-pin by clips B, having horizontal transverse projections B', which have nuts or bolts $B^2$, engaging correspondingly-threaded portions of the projections B' and serving to keep the ends of the volute in place on the projection.

The saddle is attached to the flat part A of the spring by any convenient form of fastening.

In the modification represented in Figs. 3 and 4 the pair of volutes $A^2$ $A^3$ on each side of the spring are connected together by a rod C. The two rods thus provided are attached at their ends to the volutes by small lateral extensions $C^2$ at the ends of the rods in the example illustrated. In this construction the spring is fixed to the saddle-support by a single clip D, such as is illustrated in Fig. 4, engaging with the middle of each rod C and provided with screw-threaded arms or pins D', slotted so as to form jaws to receive the rods C, which are held in place therein by nuts $D^2$, screwed onto the ends of the arms or pins D'. Instead of the above-described clip any other form may be used which will effect the same purpose. Instead of making the spring in one piece the four volutes $A^2$ $A^3$ may be detachably secured to the upper portion A. This construction is seen in Fig. 5 of the drawings, wherein the volute portions are shown as being detachably secured at $A^4$ to the portion A of the spring. By the use of this spring longitudinal adjustment of the saddle may be effected either by moving it upon the portion A of the spring or by moving the spring along the L-pin or other saddle-support in the cycle.

I claim—

1. A saddle-spring comprising a horizontal portion and four volute coils springing therefrom, two in front and two in the rear, said volute coils extending downwardly from and substantially longitudinally of the horizontal portion and being separated transversely sufficiently to permit the passage of a saddle-stalk longitudinally between the volute coils, and each volute coil remaining separate and distinct from the others all along its course save at its junction with the horizontal portion.

2. A saddle-spring comprising a horizontal portion and four volute coils springing therefrom, two in front and two in the rear, said volute coils extending downwardly from and substantially longitudinally of the horizontal portion and being separated transversely sufficiently to permit the passage of a saddle-stalk longitudinally between the volute coils and each volute coil remaining separate and distinct from the others all along its course save at its junction with the horizontal portion, in combination with a saddle-stalk having a portion extending longitudinally of and between the volute coils as set forth.

3. A saddle-spring comprising a horizontal portion and four separate and distinct volute portions, two at each end, said volute portions extending downwardly from and substantially longitudinally of the horizontal portion and being separated transversely, in combination with a saddle-stalk, having a portion extending longitudinally of and between the volute portions, and transverse horizontal projections connecting the inner ends of the volute portions with the longitudinally-extending portion of the stalk.

4. A saddle-spring comprising a horizontal portion, and four volute portions extended downwardly therefrom and being separated to adapt them to embrace a saddle-stalk as described, in combination with a saddle-stalk having a horizontal longitudinally-extending portion arranged between and embraced by the volute portions as set forth, two longitudinal horizontal rods connecting the inner terminals of the two volute portions on each side and means for connecting the said horizontal rods with the horizontal portion of the saddle-stalk.

In testimony whereof I have hereto set my hand in the presence of the two subscribing witnesses.

ALBERT FRANCIS BLAGDON-RICHARDS.

Witnesses:
JOHN WILLIAM WILLIAMS,
ESTHER ELIZABETH WILLIAMS.